United States Patent [19]
Maass

[11] Patent Number: 5,784,926
[45] Date of Patent: Jul. 28, 1998

[54] INTEGRAL COMPOSITE FLYWHEEL RIM AND HUB

[75] Inventor: David Maass, New Haven, Conn.

[73] Assignee: Dow-United Technologies Composite Products, Inc., Wallingford, Conn.

[21] Appl. No.: 697,539

[22] Filed: Aug. 27, 1996

[51] Int. Cl.$^6$ ................................................. F16F 15/30
[52] U.S. Cl. ......................................................... 74/572
[58] Field of Search ......................... 74/572, 573 R; 156/169, 172, 173, 245, 303.1, 242; 301/64.7

[56] References Cited

U.S. PATENT DOCUMENTS

| | | |
|---|---|---|
| 3,602,066 | 8/1971 | Wetherbee, Jr. . |
| 4,052,913 | 10/1977 | Schultz et al. . |
| 4,102,221 | 7/1978 | Hatch . |
| 4,266,442 | 5/1981 | Zorzi . |
| 4,285,251 | 8/1981 | Swartout . |
| 4,286,475 | 9/1981 | Friedericy et al. . |
| 4,341,001 | 7/1982 | Swartout . |
| 4,370,899 | 2/1983 | Swartout . |
| 4,458,400 | 7/1984 | Friedericy et al. . |
| 4,483,214 | 11/1984 | Mayer ............................ 74/572 |
| 4,660,435 | 4/1987 | Davis et al. ..................... 74/572 |
| 4,996,016 | 2/1991 | Wall . |
| 5,285,699 | 2/1994 | Walls et al. . |
| 5,452,625 | 9/1995 | Nardone et al. . |

FOREIGN PATENT DOCUMENTS

| | | | |
|---|---|---|---|
| 54-109584 | 8/1979 | Japan ........................ | 74/572 |
| 1174615 | 8/1985 | U.S.S.R. ..................... | 74/572 |

OTHER PUBLICATIONS

Project Summary—Project Title: Evaluation of Composite Flywheel Materials Construction—Principal Investigator: Alan D. Sapowith–Aug. 1979–Sep. 1980.

Design and Fabrication of a Fiberglass Circular–Weave Composite Flywheel by Alan D. Sapowith and Arthur L. Gurson—Jan. 1983.

"Toward Optimization of the Woven Flywheel" by Alan D. Sapowith–Aug. 1981.

"Toward Optimization of the Woven Flywheel" by Alan D. Sapowith and William E. Handy.

The English translation of the Japanese Patent Report KOKAI No. Sho 54–21477.

*Primary Examiner*—Charles A. Marmor
*Assistant Examiner*—Saúl J. Rodriguez
*Attorney, Agent, or Firm*—McAulay Fisher Nissen Goldberg & Kiel, LLP

[57] ABSTRACT

A fiber reinforced composite hub has a plurality of fiber reinforced spokes having first portions which define a drive shaft bore and second portions which mate to an innermost layer of a fiber reinforced flywheel rim. Both the rim and hub are preferably produced as stabilized preforms which are integrally or separately formed, then assembled and placed into a mold for molding into a unitary structure.

16 Claims, 3 Drawing Sheets

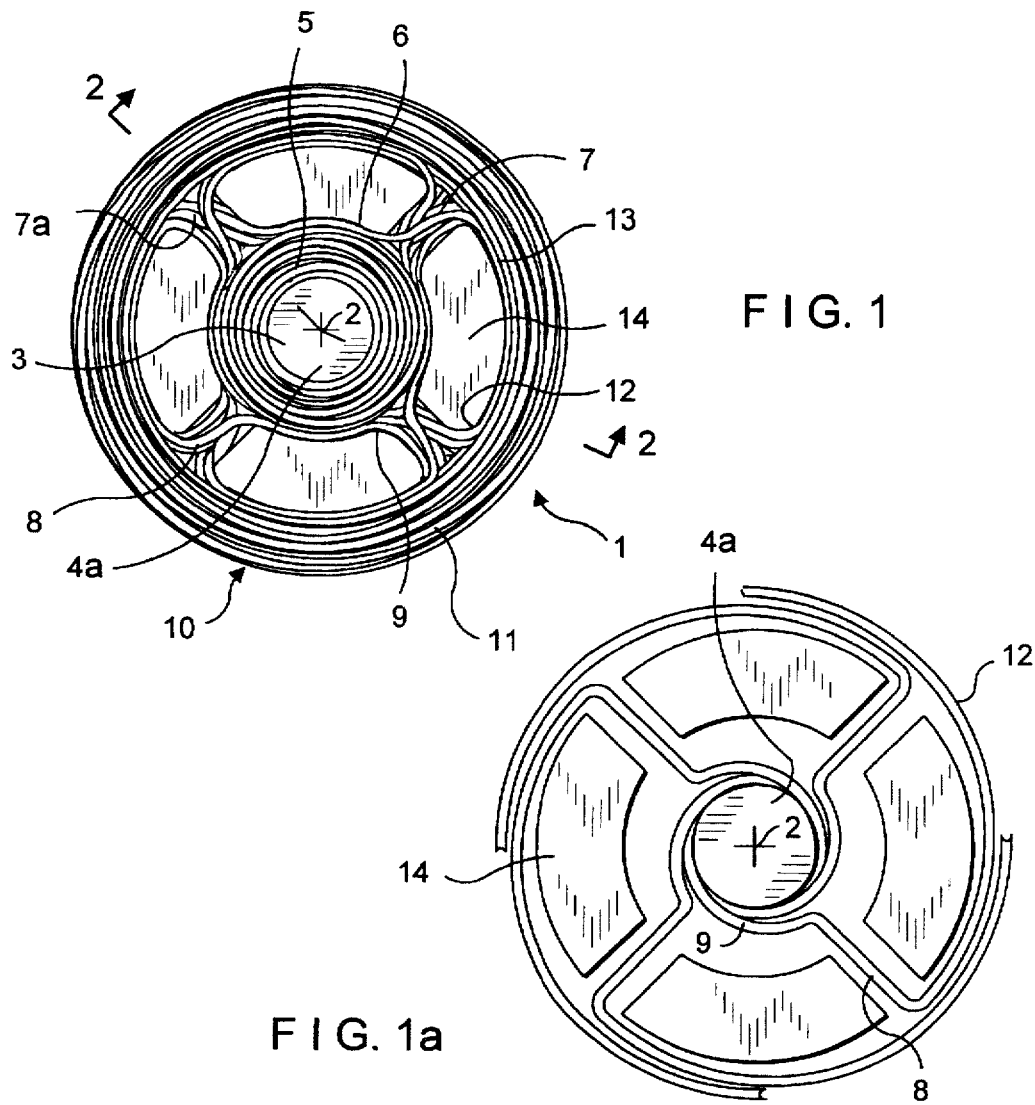
FIG. 1
FIG. 1a
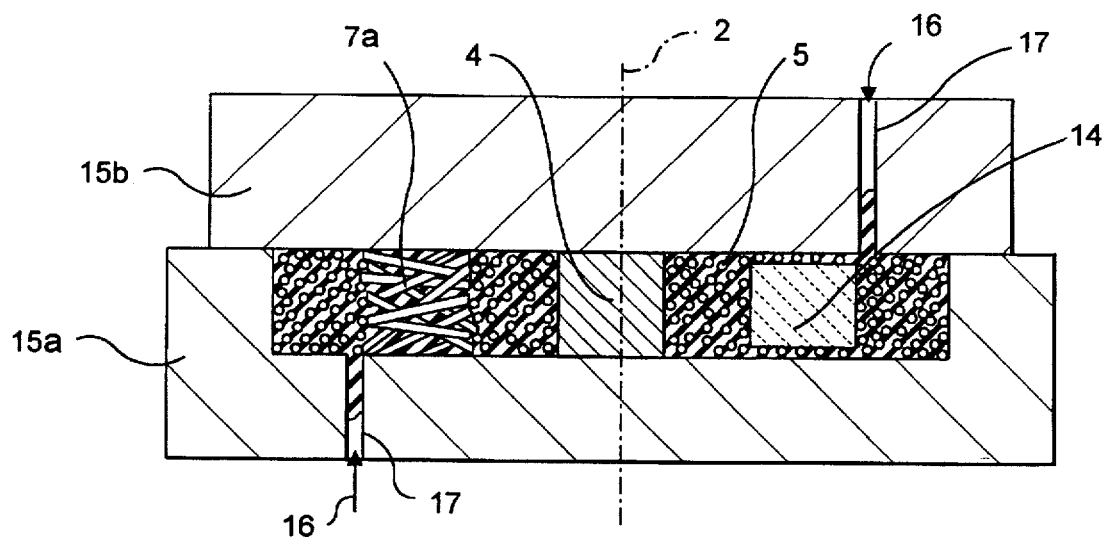
FIG. 2

INTEGRAL COMPOSITE FLYWHEEL RIM AND HUB

TECHNICAL FIELD

This invention relates to fiber reinforced composite flywheels and more particularly to a spoked fiber reinforced composite flywheel hub and/or an integral fiber reinforced flywheel rim and hub.

BACKGROUND OF THE INVENTION

Fiber reinforced composite flywheels have been proposed for use as energy storage systems for vehicles and as auxiliary power sources for utilities. However, a practical, reasonably priced fiber composite flywheel has been difficult to achieve.

The amount of energy stored in a flywheel depends upon the mass of the rim and the angular velocity of the wheel. Energy storage varies as the square of the rotational velocity. The amount of energy that may be stored in a given flywheel is limited by its rotational speed, which is dependent upon the strength of the material from which the flywheel is constructed and the manner in which the various stresses that are created are distributed within the flywheel.

Flywheels have traditionally been made of metal such as high strength steel. However, because of its high density, steel is not suitable for making a flywheel capable of storing large amounts of energy for a given flywheel weight. It has been found that producing a flywheel having a fiber reinforced composite rim offers significant advantages such as having a much lower density than steel while being at least equally strong and, in some cases, far stronger than steel.

Such fiber reinforced composite flywheel rims have been manufactured for example, by filament winding, and by the hand lay up of multiple preimpregnated plies, as described in U.S. Pat. Nos. 4,102,221 and 4,266,442.

The fiber reinforced composite rim is typically combined with a metal hub, due to the different forces acting on the hub, and the need to mate the rim through the hub to a metal drive shaft. A problem occurs when mounting the separate composite rim to a metal hub, as the difference in growth and fatigue properties between the composite rim and metal hub can cause the rim to expand away from the hub resulting in separation. Also, because of their different properties, it is common for the hub to fail before the rim. Thus, the metal hub often determines the operating life of the flywheel.

The hub is an important component of the flywheel, as it must transmit forces from the drive shaft to the flywheel rim for energy storage, and conversely, transmit the rotational force from the flywheel back to the shaft to effectively utilize the rotational mechanical energy of the flywheel. Furthermore, as the most flexible of the rotating components, the hub dynamic response controls the vibration and life of the entire rotating structure.

In U.S. Pat. No. 4,341,001, a unitary hub and shaft are disclosed comprised of two circular metallic sections having a saucer pan shape. Cylindrical metal bars are fixed to the inner surface of each section by welding or the like. The saucer pan shaped sections are brought together and permanently joined by welding with the shaped structures being collapsible in response to high speed to increase the growth of the hub to correspond to the growth of the rim. Each section has an axial shaft portion in co-axial alignment, separated by a gap to allow collapse of the saucer shaped portions at high speed.

However, such a structure still requires utilization of separate metal formed components, attached to a composite rim, and still suffers from differential growth, different fatigue properties and potential joint failure. It is of course more expensive to produce separate metal components which must be assembled together.

In U.S. Pat. Nos. 4,266,442 and 4,102,221, a flywheel including a cross ply composite disk shaped core and a relatively thick composite rim is disclosed. In this case, a central core or hub portion is produced of a cross ply composite made of a plurality of fiber containing layers. The hub is separately produced from a fiber reinforced flywheel rim composed of a multiplicity of circumferentially extending fibers. The hub and rim are placed together with an interference fit so as to prevent separation due to differential growth at high speed between the flywheel, hub and rim.

As with the previous flywheels, the production of separate components, though both of composite materials, adds to the cost and complexity of producing a composite flywheel, and though held together with an interference fit, differential growth may still result in separation. An integral flywheel rim and hub is not produced.

SUMMARY OF THE INVENTION

It is an object of the present invention to provide a flywheel having an integral fiber reinforced composite rim and hub which are produced together in a single molding step.

It is a further object of the present invention to provide a discrete fiber reinforced composite hub which may be integrated with a flywheel rim.

It is yet another object to provide a fiber reinforced composite hub having spoke means for accommodating radial growth of the rim at high speed without separation.

These and other objects of the present invention are achieved by a fiber reinforced composite flywheel having a hub formed from a plurality of fiber reinforced composite spokes extending from a fiber reinforced tube which surrounds a central bore, with the ends of the spokes mated to an innermost layer of a fiber reinforced composite rim. The flywheel is preferably produced as a unitary stabilized preform for molding.

The invention further comprises a method for producing an integral flywheel hub and rim comprising providing a hub preform composed of a plurality of spokes formed of fiber reinforced material, the fiber material containing a tackifier and having ends mated with at least a first inner circumferential layer of a composite flywheel rim, forming the rim from a plurality of hoop and/or radial fibers held together by a tackifier, thereby providing an integrated hub and rim preform, placing the hub and rim preform in a mold and injecting resin into the mold such that a flywheel having an integrally molded hub and rim is achieved.

In an alternative embodiment of the present invention, the spokes have a sinusoidal shape with curved portions which may elongate at high speeds so as to accommodate radial growth of the rim. Alternatively, canted spokes can be used, which allow for radial rim growth by bending.

An integrally molded flywheel eliminates the assembly of a plurality of components and forms an integral structure in one molding step with a higher degree of precision and at relatively low cost. Further, the possibility of separation at an interface between the rim and hub is substantially eliminated as there is no separate attachment by riveting, welding or adhesives.

BRIEF DESCRIPTION OF THE DRAWINGS

FIG. 1 is a top view of a fiber reinforced composite flywheel preform according to the present invention; FIG. 1a is an enlarged illustrative view showing an integrated hub and rim.

FIG. 2 is a cross-sectional view of the preform of FIG. 1, taken along line 2—2, the preform located in a mold for resin injection.

DETAILED DESCRIPTION OF THE INVENTION

Figure 3:
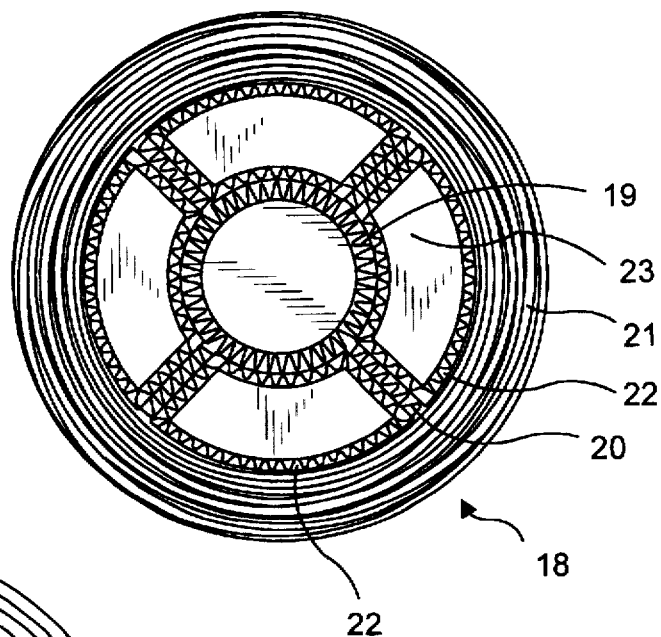
FIG. 3 is a top view of a fiber reinforced composite flywheel preform having an assembly of braided cells.

Referring to FIG. 1, an integrated composite flywheel preform 1 for forming an integral flywheel rim and hub is shown.

A "preform" is an assembly of dry fibers or fiber plies which have been shaped and debulked to approximate the shape and size of the desired article. Such a preform typically includes a stabilizer or tackifier which allows the fibers to hold their form after shaping.

The flywheel 1 has a central longitudinal axis 2 which extends through an area 3 within which a shaft 4 (FIG. 2) for rotating the flywheel may be located. During preform assembly, the area 3 is filled with either the shaft 4 or a removable mandrel 4a, as shown in FIG. 1. The area 3 is preferably surrounded by circumferential or hoop fibers 5 which form a tube 6 from which a plurality of spokes 7 extend, each spoke formed of a plurality of fibers 8 which may be in the form of filament winding, braided or woven fiber plies. The fibers 8 which define the spokes have first portions 9 which either themselves form or which mate with the tube 6. The number of spokes may vary depending on the particular design, and from 3 to 8 spokes most likely would be used, with the tube and spokes forming a hub of the flywheel.

A flywheel rim 10 is composed of a plurality of hoop fibers 11 which are retained in position utilizing a stabilizer or tackifier. The rim may be composed, additionally, of radial fibers woven with the hoop fibers, and these are not shown here solely to ease illustration of the invention. To integrate the spokes and rim, each spoke has a second portion 12 mated to a first inner layer 13 of the rim.

FIG. 1a is an illustration showing in more detail a manner for forming the integrated flywheel. The mandrel 4a is surrounded by the first portions 9 of four fibers 8, which overlap to form the tube 6. Second portions 12 overlap to form or mate to the first inner layer of the rim (not shown).

Referring again to FIG. 1, a plurality of mandrels 14 are located in the areas between the spokes 7 for maintaining the spoke fibers in the proper position prior to mating to the rim. Thus, the hub preform may be first produced and the rim formed by filament winding or polar weaving directly over the hub preform. Of course, the rim can be separately formed and then added to the hub preform.

The mandrels may be removed after molding mechanically or by heat, such as by using eutectic metal mandrels, or by dissolving in water or other solvents. Such materials are known in the art for producing removable mandrels.

The mating of the spokes into at least the first layer of the flywheel rim allows for the co-molding of the mated rim and hub structure, thus avoiding the production of separate components which must be attached together. Through this integration, a unitary high strength composite flywheel can be achieved.

Referring to FIG. 2, the preform is incorporated in a mold cavity formed between a pair of mold sections 15a and 15b. A hardenable plastic 16 is injected through ports 17 into the mold, the plastic infiltrating the fibers in the hub, spokes and rim so as to produce an integrated composite flywheel. As shown, the shaft 4 is molded integrally with the flywheel, though it is also possible to use a shaft shaped mandrel which can later be removed, with the opening adapted to later receive the flywheel drive shaft.

Referring to FIG. 3, an alternative embodiment of the present invention is shown. In this embodiment of the invention, a flywheel 18 has a tube 19, spokes 20 and a rim 21 which are similarly assembled as a preform as described previously. However, the spokes are prepared by filament winding or braiding fibers 22 over mandrels 23 for producing a plurality of preformed spoke cells 24, and a tube cell 25, which are assembled into a subunit 26, best seen in FIGS. 4a–c. The fiber rim 21 of FIG. 3 is preferably wound, braided or woven over the subunit. The braiding of such cells is described in U.S. Pat. No. 5,399,395, which is commonly owned by the assignee of the present invention.

Figure 4A:
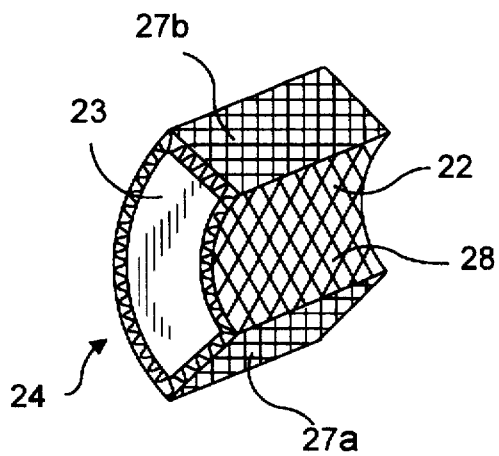
FIG. 4a is a perspective view of a braided cell for forming a spoke.
Figure 4B:
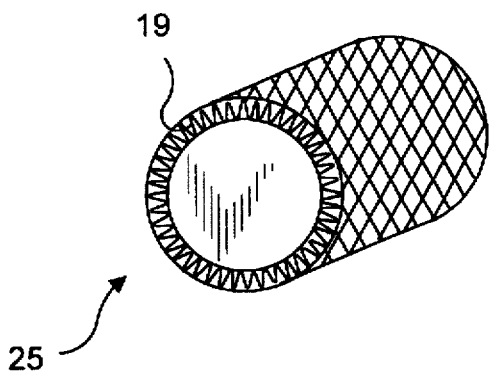
FIG. 4b is a perspective view of a braided cell for forming a tube.
Figure 4C:
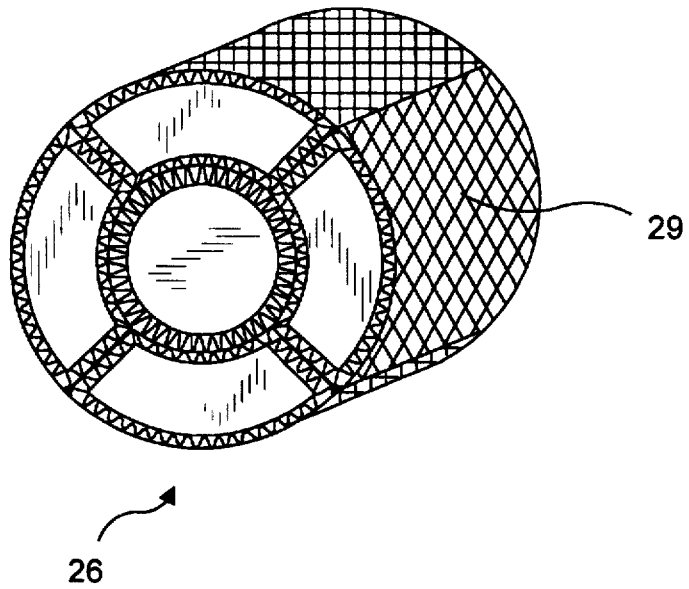
FIG. 4c is a perspective of a hub subunit assembly of braided cells.

Referring to FIGS. 4a–4c, each spoke cell 24 includes the mandrel 23 about which the fiber 22 is woven, wound or braided. Each spoke cell provides portions of two spokes 27a and 27b, a portion 28 mating to the tube cell 25, shown in FIG. 4b, and a portion 29 mating to the rim 21. While these cells can be molded together to form a separate hub, it is preferred that these preformed components be assembled and placed in a mold with a rim preform, and resin injected so as to provide an integral composite flywheel.

Figure 5A:
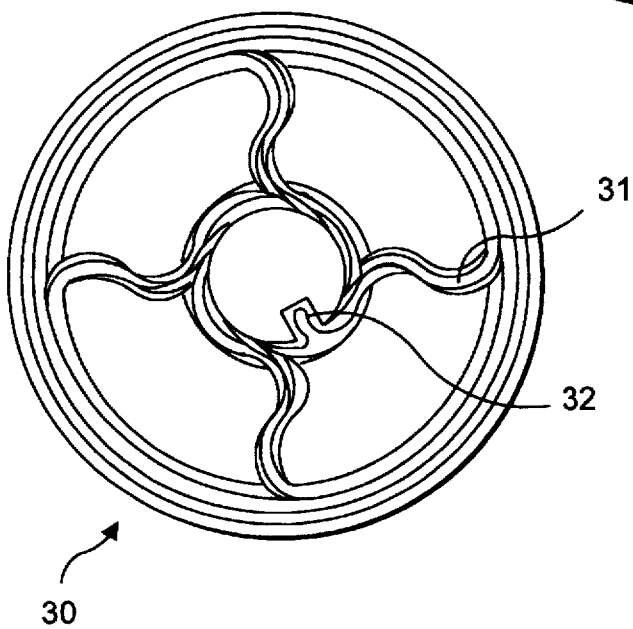
FIG. 5a is a top view of a fiber reinforced composite flywheel having sinusoidal shaped spokes.
Figure 5B:
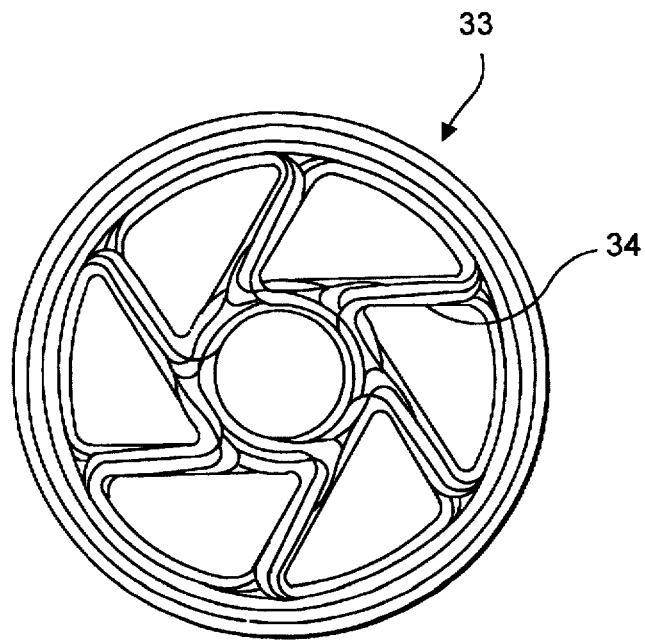
FIG. 5b is a top view of a fiber reinforced composite flywheel having canted spokes.

Referring to FIG. 5a, another alternative of the present invention is shown. A flywheel 30 has four radially extending spokes 31, which have a sinoidal or curved shape. This shape is useful because the spokes extend to accommodate an increase in radial rim diameter at high speed to minimize loads and distortion transmitted to the rim. In this embodiment, a keyway 32 is provided for later engagement to a drive shaft. Of course, the shaft can be mated to the flywheel hub using a shrink fit, adhesive bonding or through integral molding, and the choice of attachment is left to the designer. Another alternative, shown in FIG. 5b, is a flywheel 33 which has canted spokes 34 that are offset so as to extend tangentially, rather than radially from the tube. These canted spokes bend at high speed to similarly extend to accommodate rim growth.

The fiber reinforced composite flywheel hub, spokes and rim may be produced of any of the available fiber materials such as graphite, carbon, polyamide, glass, boron, ceramic fiber and combinations thereof. The hardenable plastics or resins usable with the present invention are any of the known thermoplastic or thermosetting plastics, and preferably are those which are commercially available, such as vinyl, epoxy, polyester, polyamide, bismalimides, etc., though epoxy and bismalimide resins are preferred.

The stabilizers or tackifiers used with the present invention are also those which are known for example as described in U.S. Pat. Nos. 5,427,726, 5,427,725, 5,217,766, 5,080,851, 5,071,711 or 4,992,228. These are principally thermosetting resin based tackifiers.

The terms "tackifier" or "stabilizer" are used interchangeably to describe a resin distributed among the fibers, which is capable of holding the fibers together, before molding, in a desired shape.

Other suitable tackifiers include resins such as epoxy, polyamide, particularly bismaleimide, polycyanate ester resins, vinyl ester resins, benzocyclobutene resins, etc.

Examples of suitable tackifiers composed of resin and hardener mixtures includes a mix of epoxy resin such as Tactix 123 epoxy made by Dow Chemical Co. or PR 500 manufactured by 3M Co. Another suitable resin is 1,1'-MDA Bismaleimide (BMI) resin, known as 5250-4 RTM BMI resin, manufactured by CYTEC Chemical Co.

These are exemplary resins which are useful since many components are produced using either epoxy or BMI resin and these tackifiers are compatible in those systems. However, other resins can be identified by those skilled in the art for use with specific resin systems and the invention is not limited to those discussed herein.

Utilizing the present invention, a fiber reinforced composite flywheel hub can be produced as a discrete or integral preform with a fiber reinforced composite rim. Once assembled, these components may be molded into an integral structure of high strength, with increased resistance to separation between the rim and hub. The hub preform can have radial, sinusoidal or canted spokes which extend to accommodate growth of the rim.

While preferred embodiments of the present invention have been shown and described it will be understood that various changes or modifications can be made without varying from the scope of the present invention.

I claim:

1. A flywheel hub preform fiber preform comprising a plurality of fibers formed in the shape of spokes, the fibers having first portions which are shaped to form a central bore sized to accept a drive shaft therein, the fibers having second portions which extend circumferentially so as to mate to a first innermost layer of a fiber preform for a flywheel rim.

2. The flywheel hub preform of claim 1, wherein the composite spokes contain a stabilizer for holding the spokes in their assembled shape, the assembly being a preform adapted for molding.

3. The flywheel hub preform of claim 1, wherein the spokes have a fiber wound structure.

4. The flywheel hub preform of claim 1, wherein the spokes have a braided fiber structure.

5. The flywheel hub preform of claim 1, wherein the spokes have a woven fiber structure.

6. The flywheel hub preform of claim 1, further comprising a shaft located in the bore.

7. The flywheel hub preform of claim 1, wherein the spokes are formed of fibers selected from the group consisting of graphite, glass, polyamide and combinations thereof.

8. The flywheel hub preform of claim 1, further comprising hoop fibers in the form of a tube disposed between the central bore and the first portions.

9. A flywheel fiber preform comprising:
a flywheel hub preform fiber preform having a plurality of fibers in the shape of spokes, the spoke fibers having first portions which are shaped to form a central bore sized to accept a drive shaft therein;
a rim fiber preform having a first innermost layer composed of a plurality of hoop fibers for surrounding the hub preform, the spoke fibers having second portions which extend circumferentially to mate to the first innermost layer of the rim preform.

10. The flywheel preform of claim 9, wherein the composite spokes and composite rim contain a stabilizer for holding the spokes and rim in their assembled shape, the assembly being a preform adapted for molding into a unitary structure.

11. The flywheel preform of claim 9, wherein the spokes have a fiber wound structure.

12. A flywheel preform of claim 9, wherein the spokes have a braided fiber structure.

13. The flywheel preform hub of claim 9, wherein the spokes have a woven fiber structure.

14. The flywheel preform of claim 9, wherein the spokes and rim are formed from fibers selected from the group consisting of graphite, glass, polyamide and combinations thereof.

15. The flywheel preform of claim 9, further comprising a shaft located in the bore.

16. The flywheel of claim 9, further comprising fibers in the form of a tube disposed between the central bore and the first portions.

* * * * *

UNITED STATES PATENT AND TRADEMARK OFFICE
CERTIFICATE OF CORRECTION

PATENT NO. : 5,784,926
DATED : July 28, 1998
INVENTOR(S) : Maas

It is certified that error appears in the above-identified patent and that said Letters Patent is hereby corrected as shown below:

Add claims 17, 18, 19, and 20 as follows:

--Claim 17. The flywheel hub fiber preform of claim 1, wherein the plurality of fibers are in the shape of sinusoidal spokes.--

--Claim 18. The flywheel bub fiber preform of claim 1, wherein the plurality of fibers are in the shape of canted spokes.--

--Claim 19. The flywheel hub fiber preform of claim 9, wherein the plurality of fibers are in the shape of sinusoidal spokes.--

--Claim 20. The flywheel bub fiber preform of claim 9, wherein the plurality of fibers are in the shape of canted spokes.--

Signed and Sealed this

Second Day of March, 1999

*Attest:*

*Attesting Officer*

Q. TODD DICKINSON

*Acting Commissioner of Patents and Trademarks*

UNITED STATES PATENT AND TRADEMARK OFFICE
CERTIFICATE OF CORRECTION

PATENT NO. : 5,784,926
DATED : July 28, 1998
INVENTOR(S) : Maas

It is certified that error appears in the above-identified patent and that said Letters Patent is hereby corrected as shown below:

U. S. PATENT DOCUMENTS

| EXAMINER INITIAL | | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|---|
| | AA | 5 | 3 | 9 | 9 | 3 | 9 | 5 | 3/1995 | Forman, et al | | | |
| | AB | 5 | 4 | 2 | 7 | 7 | 2 | 8 | 6/1995 | White, et al | | | |
| | AC | 5 | 4 | 2 | 7 | 7 | 2 | 5 | 6/1995 | White, et al | | | |
| | AD | 5 | 2 | 1 | 7 | 7 | 6 | 6 | 6/1993 | Flonc, et al | | | |
| | AE | 5 | 0 | 8 | 0 | 8 | 5 | 1 | 1/1992 | Flonc, et al | | | |
| | AF | 5 | 0 | 7 | 1 | 7 | 1 | 1 | 12/1991 | Heck, et al | | | |
| | AG | 4 | 9 | 9 | 2 | 2 | 2 | 8 | 2/1991 | Heck, et al | | | |
| | AI | | | | | | | | | | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION | |
|---|---|---|---|---|---|---|---|---|---|---|---|---|---|
| | | | | | | | | | | | | YES | NO |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |